March 11, 1924.

F. O. BECKNER

DIESINKING MACHINE

Filed Jan. 3, 1922   3 Sheets-Sheet 1

1,486,121

INVENTOR.
Frank O. Beckner
BY George J. Ottach
ATTORNEY.

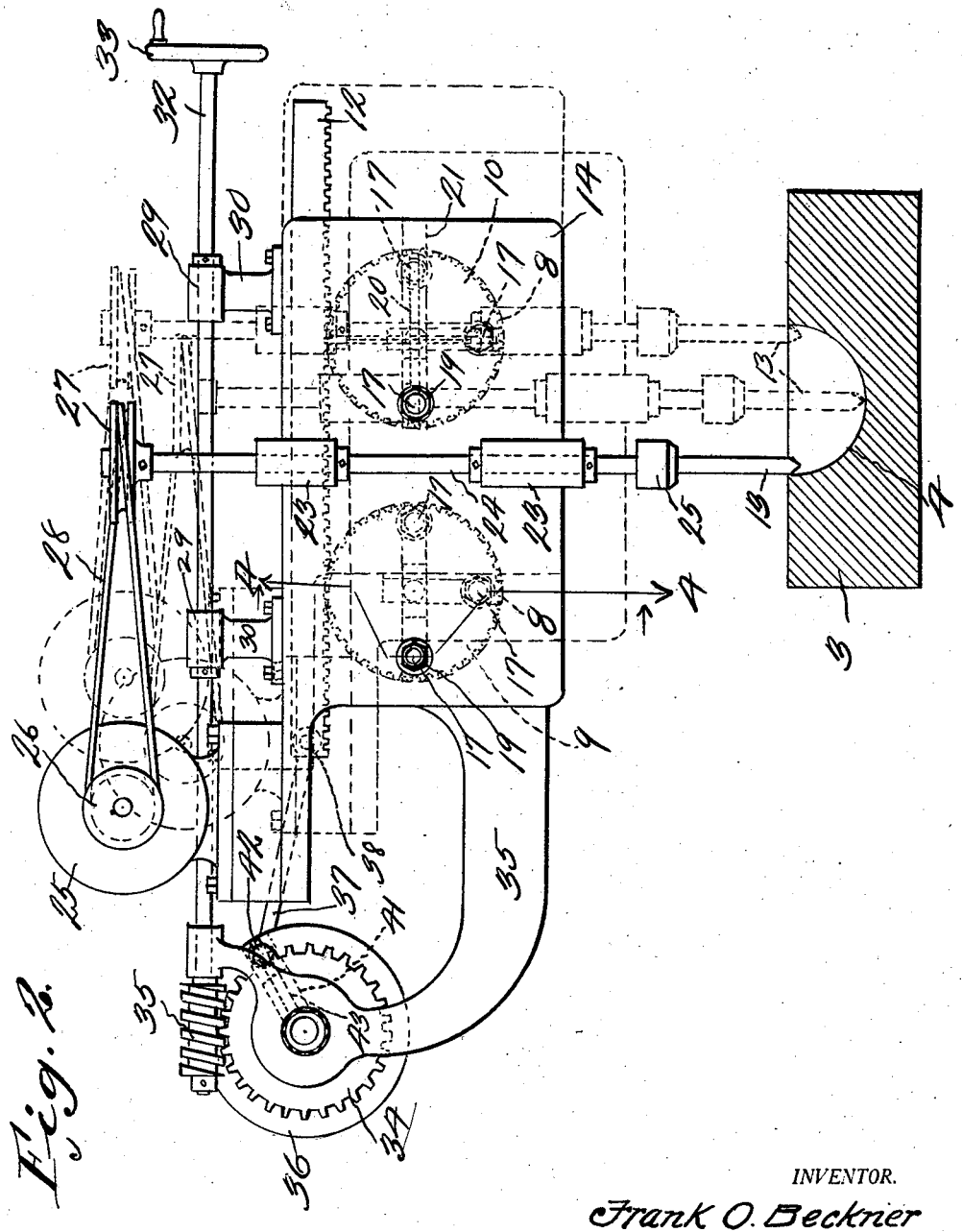

March 11, 1924.
F. O. BECKNER
DIESINKING MACHINE
Filed Jan. 3, 1922
1,486,121
3 Sheets-Sheet 3
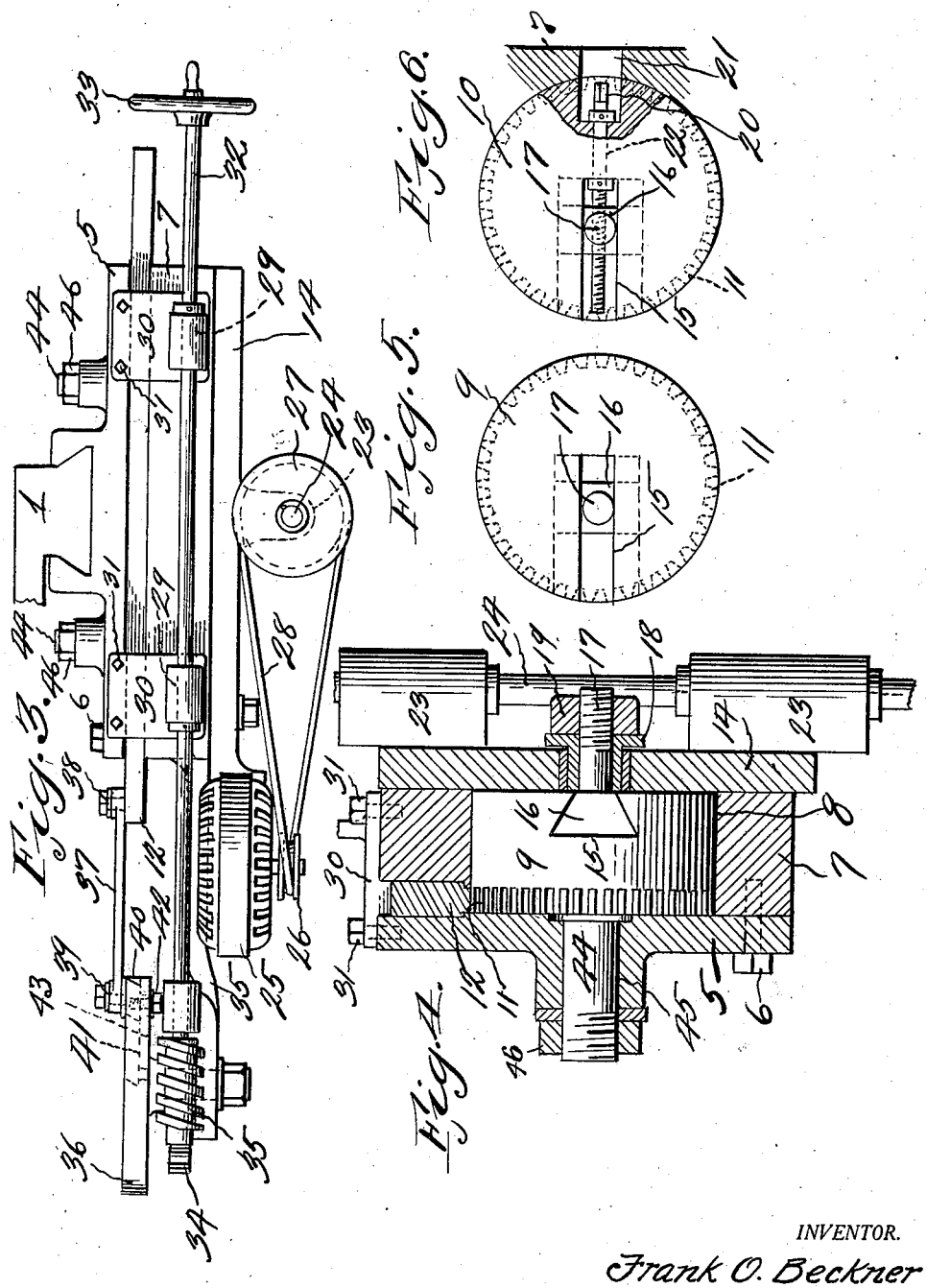
INVENTOR.
Frank O. Beckner
BY
ATTORNEY.

Patented Mar. 11, 1924.

1,486,121

UNITED STATES PATENT OFFICE.

FRANK O. BECKNER, OF SOUTH BEND, INDIANA.

DIESINKING MACHINE.

Application filed January 3, 1922. Serial No. 526,677.

*To all whom it may concern:*

Be it known that I, FRANK O. BECKNER, a citizen of the United States, residing at South Bend, in the county of St. Joseph and State of Indiana, have invented certain new and useful Improvements in Diesinking Machines, of which the following is a specification.

The invention relates to die sinking machines and has for its object to provide a machine of this character wherein recesses may be formed in material at different arcs up to 180 degrees, thereby obviating the difficulty incident to forming recesses semi-circular with milling machines where the arbors interfere, and prevent a semi-circular recess.

A further object is to provide a machine for forming semi-circular recesses, said recesses varying in degree as desired. The machine comprises a plate mounted on rotatable gears actuated through the medium of a reciprocating rack, a drilling element carried by said plate, and means whereby the rotatable gears may be actuated through the medium of the reciprocating rack for imparting arcuate movement to the plate and drilling element.

A further object is to provide means whereby the drilling element carrying plate may be adjusted on the rotatable gears, thereby allowing semi-circular recesses to be formed by the drilling element of various depths.

A further object is to actuate the reciprocating rack through the medium of a rotatable disc having a connecting rod connection with the reciprocating rack, the connection between the connecting rod and the rotatable disc being adjustable, thereby allowing the reciprocating rack to be adjusted and limited in its strokes for varying the size of the arcuate recesses formed by the drilling element.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 2 is an enlarged view of the controlling mechanism for the drilling element, showing in dotted lines the maximum low and the maximum high position of the mechanism during a recess forming operation.

Figure 3 is a top plan view.

Figure 4 is a vertical transverse sectional view taken on line 4—4 of Figure 2.

Figure 5 is a front view of one of the rotatable gears.

Figure 6 is a front view of the other rotatable gear showing the plate adjusting means carried thereby and a portion of an adjacent block provided with an aperture whereby the adjusting means of the rotatable gear may be reached.

Figure 1:
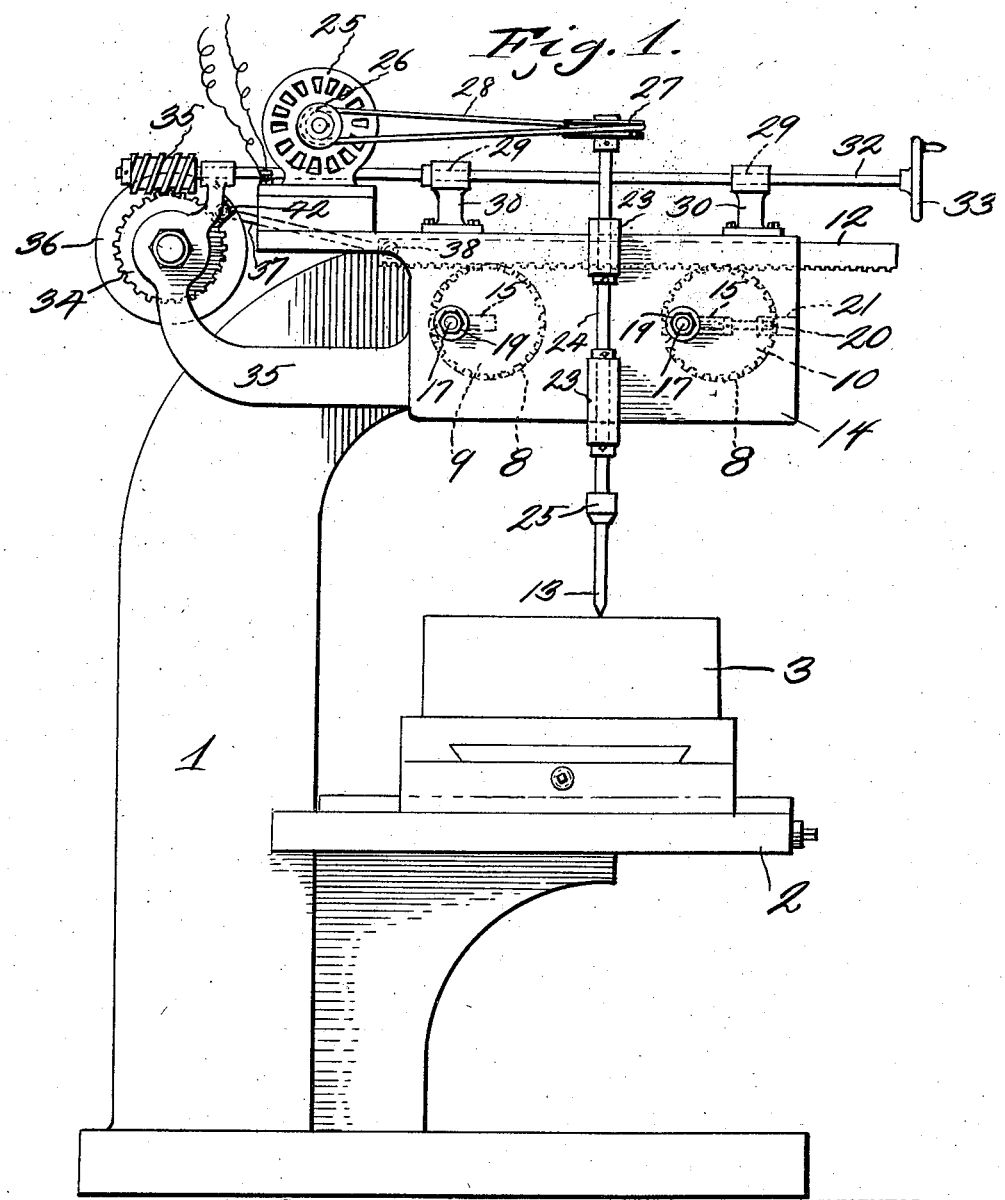
Figure 1 is a front elevation of the machine.

Referring to the drawings, the numeral 1 designates the frame of the machine, and 2 the table thereof, on which may be supported a piece of material in which a semi-circular recess 4 is to be formed. Supported on the upper end of the frame 1 is a vertically disposed plate 5, which plate has secured thereto by means of bolts 6 a block 7. The block 7 is provided with spaced annular chambers 8 in which chambers are rotatably mounted rotatable gear blocks 9 and 10. The outer peripheries of the gear blocks 9 and 10, adjacent their rear sides, are provided with gear teeth 11, which teeth mesh with a horizontally disposed rack bar 12. When the rack bar 12 is reciprocated the gear blocks 9 will simultaneously rotate in the same direction and the degree of rotation will vary according to the length of the stroke of the rack bar 12 during its reciprocation. It will be seen that by controlling and varying the length of the strokes of the rack bar that the arc of the cutting element 13, which element is carried by a plate 14 pivotally mounted on the gear blocks 9 and 10, at points spaced from their centers, may be varied according to the degree and size of recess being formed. Also that if desired this operation may be facilitated by mounting the block of material 3 in any kind of material holder whereby the block may be held at various angles. Extending diametrically through the gear blocks 9 and 10 are recesses 15, in which recesses are mounted and dovetailed blocks 16, said blocks being radially movable and provided with bolts 17 and sleeves 18. It will be seen that when the nuts 19 are tightened on the bolts 17 that the sleeves 18 will be forced into close and binding engagement with the gear blocks 9, thereby holding the dovetailed blocks 16 against movement, and in any position to which they may have been adjusted in relation to the centers of the gear blocks 9 and 10. Mounted on the sleeves 18 carried by the bolts 17 is the plate 14, which plate during the partial or complete rotation of the gear blocks 9 and 10, will move downwardly and then upwardly in a horizontal position, however during its movement, the cutting element 13 will move in an arc, the radius of which will depend upon the distance of the bolts 17 from the centers of the gear blocks 9 and 10 and the width of the cutting element 13. When it is desired to vary the positions of the bolts 17, the gear block 10 is rotated until the adjusting screw 20 is in registration with the aperture 21 in the end of the block 7, at which time a wrench may be placed on the adjustment screw 20 and said screw rotated in its bearing 22, thereby causing the dovetailed block 16, through which the adjusting screw threads, to move inwardly or outwardly to any position desired. During this inward or outward movement of the dovetailed block 16 carried by the adjusting screw 20, the plate 14 also moves and also the dovetailed block 16 carried by the gear block 9. After the bolts 17 have been properly positioned, the nuts 19 are tightened thereby locking the bolts and dovetailed blocks 16 in adjusted positions.

Rotatably mounted in bearings 23 carried by the plate 14 is a vertically disposed shaft 24, the lower end of which is provided with a conventional form of chuck 25 for the reception of the cutting element 13. Supported on the upper side of the plate 14 is a motor 25 which may get its electric energy from any suitable source, which motor is provided with a drive pulley 26 which is belted to a pulley 27 carried by the upper end of the shaft 24 by means of the belt 28. It will be seen that the motor moves at all times with the plate 14 and hence constantly rotates the shaft 24 during its movement, hence rotating the cutting element 13.

Rotatably mounted in bearings 29 of brackets 30 carried by and secured to the upper sides of the vertically disposed plate 5 by means of bolts 31 is a horizontally disposed operating shaft 32, which shaft is provided with a handle wheel 33 whereby the operator may manually rotate the shaft 32 for imparting a rotary movement to the worm gear 34 mounted on the arm 35 carried by the block 7. It will be seen that when the worm gear 34 is rotated through the medium of the worm 35 carried by the shaft 32, that the disc 36 will simultaneously move a distance equal to the distance of movement of the worm gear 34, and that the rack bar 12 will be reciprocated through the medium of the connecting rod 37. The connecting rod 37 is pivotally connected at 38 to the rack bar 12, and at 39 to an adjustable block 40 dovetailed in a dovetailed groove 41, which is radially disposed in the disc 36 and held in various positions relative to the center of the disc 36 by means of the set screw 42 which extends through a slot 43 in the inner face of the disc 36. If the rack bar and the pivotal point 39 are positioned substantially as shown in Figures 2 and 3, the cutting element 13 will move substantially over an arc of 180 degrees. However if it is desired to form a recess at a different arc, it is obvious that this may be accomplished by placing the pivotal point 39 closer to the center of the disc 36, which will reduce the length of the strokes or stroke of the rack bar 12 and hence limit the distance of rotation of the gear blocks 9 and 10 which carry the plate 14 and the cutting element 13, therefore the recess being formed will be limited in size to the distance of stroke of the rack bar 12.

The gear blocks 9 and 10 are provided with stub shafts 44, which are mounted in bearings 45 of the vertical plate 5 and insure a positive rotation of the gear blocks 9 and 10 and prevent wear on the periphery thereof. The outer ends of the stub shafts 44 are provided with nuts 46 which prevent outward displacement of the gear blocks 9 and 10, and also maintain said blocks and the plate 14 carried thereby in position. During the movement of the plate 14, the inner face thereof is maintained in sliding engagement with the front face of the block 7 and the gear blocks 9 and 10, thereby insuring an accurate movement of the cutting element 13 in a vertical plane.

A manual operation of the operating shaft 32 has been described and set forth, however it is to be understood that the same may be operated automatically or through the medium of any source of power.

The invention having been set forth what is claimed as new and useful is:—

1. A die sinking machine comprising a frame, spaced gears carried by said frame, a rack bar meshing with said gears, a member pivotally connected to the gears at points spaced from their centers, a cutting element carried by said member, and means for moving the rack bar longitudinally, said means comprising a rotatable member, and a connecting bar connecting the rotatable member to the rack, said connecting bar being connected to the rotatable member at a point spaced from its center.

2. A die sinking machine comprising a frame, rotatable gears spaced from each other and mounted on said frame, a plate pivoted to said gears at points spaced from their centers, a cutting element carried by said plate, a rack bar meshing with said gears, a rotatable member carried by the frame, a connecting rod connecting the rotatable member to the rack bar, means whereby the connecting point between the connecting bar and the rotatable member may be varied in relation to the center of the rotatable member, and means whereby said rotatable member may be rotated.

3. The combination with a cutting element for making arcuate recesses, of means for moving the cutting element in an arc, said means comprising spaced gears, radially adjustable pins carried by said gears, a plate, said pins extending through apertures in the plate, said cutting element being carried by said plate, means whereby upon an outward adjustment of one of the pins, the other pin will move outwardly, and means for rotating said gears.

4. The combination with a cutting element, of a plate mounting said cutting element, said plate and cutting element being mounted on pins carried by rotatable discs, of means for adjusting said pins outwardly or inwardly simultaneously with respect to the centers of said discs, said means comprising blocks slidably mounted in slots of the gears and adjusting screw means cooperating with one of said blocks and forming means whereby the blocks may be simultaneously moved.

5. A die sinking machine comprising a frame, spaced gears carried by said frame and pivoted thereto, a plate pivotally connected to said gears at points spaced from their centers, a cutting element carried by said plate, means for rotating said gears simultaneously, thereby causing said plate and cutting element mounted thereon to move in an arc, and a motor mounted upon and moving with said plate and having driving connection with the cutting element.

6. A die sinking machine comprising a frame, spaced gears pivoted to said frame, a plate pivoted to gears at points spaced from their centers, means whereby the pivotal points of the plate may be varied in relation to the centers of the gears, a rack bar meshing with said gears, means whereby said rack bar may be reciprocated for rotating said gears in unison, a cutting element carried by said plate, and a motor mounted upon and moving with said plate and having driving connection with the cutting element.

In testimony whereof I affix my signature.

FRANK O. BECKNER.